UNITED STATES PATENT OFFICE.

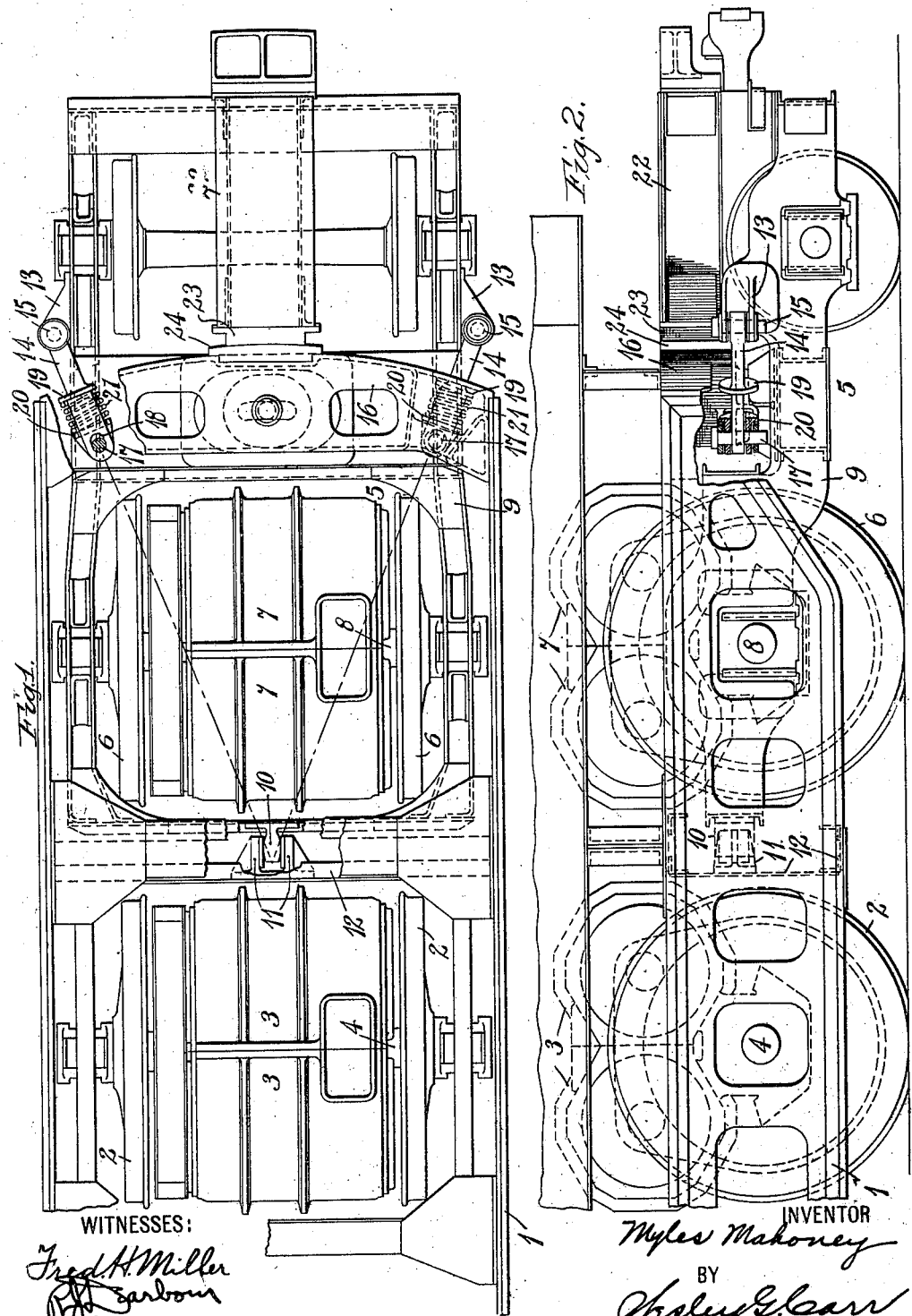

MYLES MAHONEY, OF WILKINSBURG, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,078,630.  Specification of Letters Patent.  Patented Nov. 18, 1913.

Application filed March 20, 1911. Serial No. 615,536.

*To all whom it may concern:*

Be it known that I, MYLES MAHONEY, a subject of the King of Great Britain, and a resident of Wilkinsburg, in the county of Allegheny and State of Pennsylvania, have invented a new and useful Improvement in Locomotives, of which the following is a specification.

My invention relates to railway locomotives and is specially designed for use in connection with locomotives which are propelled by electric motors, though not necessarily restricted to locomotives so operated.

One object of my invention is to provide a simple and effective connection between two locomotive trucks, preferably comprising short independent radius bars which are relieved from compression strains and which are so arranged as to permit of circumferential movement of one truck relative to a pivotal point in the other and to transmit driving forces from one truck to the other only in one direction.

Another object of my invention is to provide an efficient and compact structure for a locomotive having a central main truck, preferably constituting a rigid wheel base, and radial trucks at its ends.

Locomotives which are capable of drawing very heavy loads at relatively high speeds have frequently comprised a plurality of centrally located driving axles and pony trucks located at its ends and having relatively small guide wheels. It has been my aim to reduce the rigid wheel base of locomotives of this general character, although my invention is not restricted to any particular type of locomotive, by providing a radial truck at each end of the locomotive having small guide wheels on its outer axle and relatively large driving wheels and driving motors associated with its inner axle. Each of the radial trucks is connected to the main truck or frame of the locomotive by means of a pair of short radius bars the center lines of which, if extended, meet in a cross tie of the main truck, in which means is provided for laterally restraining the radial truck. The arrangement of parts is such that the radius bars coöperate with the restraining means in permitting the usual circumferential adjustment of the radial truck. The radius bars are, however, not depended on for taking the compression strains caused by a pushing or bumping action in case of engagement with another railway vehicle or with a stationary bumper structure, each of the radial trucks being provided with an elevated portion which is adapted to be forced against the adjacent end beam of the main track, under these conditions.

In the accompanying drawing, Figure 1 is a plan view of substantially one-half of a locomotive truck structure, parts being broken away, and Fig. 2 is a side elevation of the structure shown in Fig. 1, certain parts being broken away and in section.

The main frame 1 of the locomotive supports a suitable cab (not shown) and is, in turn, supported by two pairs of truck wheels 2 which constitute a rigid wheel base and each of which is operatively connected to a pair of electric motors 3 that are suitably mounted above the wheel axles 4. Each end of the locomotive is provided with a four-wheel radial truck 5, a pair of large wheels 6 that are suitably geared to a pair of electric motors 7 which are mounted above the axle 8 and bear the same relation thereto and to the corresponding truck wheels as that borne by the pair of electric motors 3 and the truck wheels 2 to the axles 4 constituting parts of the rigid wheel base.

The inner end of the frame 9 of each radial truck is provided with a longitudinally projecting nose 10 having convexly curved sides which fit between jaws 11 with which a cross tie 12 of the main frame is provided. Any other suitable means may be utilized for laterally restraining the truck in the plane of the cross tie 12. The radial truck frame 9 is provided, at each side, with a pair of lugs or ears 13 between which is pivotally mounted one end of a bar 14 by means of a pin 15, the bar being inclined inwardly at such an angle that its axis is disposed in the line of a radius of curvature having the nose 10 at the rear end of the frame as its center. The inner end of each bar 14 is connected to the end beam 16 of the main frame by means of a pin 17, the bar being provided with an elongated slot 18 to receive the pin in order to permit of lost motion and, interposed between a shoulder 19 on the bar and a pivoted block 20 is a helical spring 21 to act as a yielding buffer in case of pushing or bumping action. The draft bars 14 are relieved from compression strains under pushing or bumping action, by means of an elevated central longitudinal beam 22 of the radial truck, having a concave plate 23 which is opposed to an end piece 24 of the main truck. The end piece 24 has a convex cylindrically curved outer surface corresponding to the adjacent surface of the plate 23, both curvatures being concentric with the pivotal point of the truck.

Since the bars 14 are radially disposed relative to the pivotal point of the radial truck they tend to maintain an alinement between the trucks which they connect. This tendency is augmented by the spring 21 but some well known centering device is preferably employed in addition thereto, although none is shown since it forms no part of my present invention. The principal object of the springs 21 is to cushion the bumping strains, as above indicated, and the end piece 24 or the plate 23 or both may be backed by suitable springs in lieu of the springs 21.

It will be understood from the foregoing description that the radial trucks may be removed without disturbing any of the other portions of the structure except the pins 15 and that they may be as readily replaced in position when any changes or repairs which necessitate the removal have been effected.

I claim as my invention:

1. A locomotive comprising two four-wheel, motor-equipped trucks and two independent radius bars interposed between said trucks and provided with yielding connections to obviate bumping strains.

2. A locomotive comprising a plurality of motor-equipped trucks, and independent radius bars interposed between said trucks and provided with yielding resilient means to relieve them from longitudinal compression strains.

3. In a locomotive, the combination with a motor-equipped main truck and a motor-equipped radial truck, of interposed short radius bars, and means for permitting circumferential movement of the radial truck about a point in the main truck that is remote from said radius bars.

4. In a locomotive, the combination with a main truck, of a radial truck and means carried by the main truck for laterally restraining relative movement of the radial truck in a predetermined lateral plane, and radius bars connecting the two trucks, the extended center lines of which intersect at the point of side restraint.

5. In a locomotive, the combination with a main truck, of a radial truck and means carried by the main truck for laterally restricting relative movement of the radial truck in a predetermined lateral plane, and radius bars connecting the two trucks and provided with lost motion connections to one of them.

6. In a locomotive, the combination with a main truck frame and its wheels and axles, of a radial truck frame having a nose at its inner end to engage a recess in a cross beam of the main truck frame, radius bars having slot and pin connections with the adjacent end of the main truck frame, and means for relieving said radius bars from compression strains.

7. In a locomotive, the combination with a main truck having a rigid wheel base, of an end truck having a pivotal connection between its inner end and a cross tie of the main frame, radius bars having lost-motion connections with the adjacent end of the main truck frame, and means for relieving said radius bars from compression strains.

8. In a locomotive, the combination with a main truck having a rigid wheel base, of an end truck having a pivotal connection with a cross tie of the main truck frame, radius bars having lost-motion connections between the sides of the end truck frame and the adjacent end of the main truck frame, springs for taking up the lost-motion of said connections, and coöperating curved-surface impact plates upon the two truck frames.

9. In a locomotive, the combination with a main truck having a rigid wheel base, a radial end truck, means in a cross tie of the main truck frame for laterally restraining the end truck, radius bars having detachable pivotal connections to the said truck frames, and means for relieving said radius bars from longitudinal compression strains.

In testimony whereof, I have hereunto subscribed my name this 14th day of March, 1911.

MYLES MAHONEY.

Witnesses:
R. J. DEARBORN,
B. B. HINES.

Copies of this patent may be obtained for five cents each, by addressing the "Commissioner of Patents, Washington, D. C."